UNITED STATES PATENT OFFICE.

ARTHUR D. LITTLE, OF BOSTON, MASSACHUSETTS, ASSIGNOR TO STANDARD ALCOHOL COMPANY, OF NEW YORK, N. Y., A CORPORATION OF MAINE.

FOOD COMPOSITION FOR STOCK.

1,092,221.　　　Specification of Letters Patent.　　Patented Apr. 7, 1914.

No Drawing.　　Application filed July 15, 1912. Serial No. 709,469.

*To all whom it may concern:*

Be it known that I, ARTHUR D. LITTLE, a citizen of the United States, residing at Boston, in the county of Suffolk and State of Massachusetts, have invented certain new and useful Improvements in Food Composition for Stock, of which the following is a specification.

This invention relates to food-compositions for cattle or other live stock and to methods of preparing the same, the object of the invention being the preparation of an inexpensive, palatable and nutritious food-product from cheap materials, and especially from materials which are commonly regarded as waste products.

According to the present invention, materials consisting largely of cellulose or ligno-cellulose, as for example corn stalks, bagasse or other residues of sugar-cane or of other sugar-producing plants, sawdust, or the like, are digested in presence of hydrochloric acid or chlorin under conditions to convert a substantial proportion of the charge into sugars. Thereafter the free hydrolyzing agent is neutralized by means of sodium carbonate or equivalent reagent, whereby sodium chlorid is formed; or in case free chlorin is present there is some formation of sodium hypochlorite which is thereafter reduced to chlorid. The resulting product is a palatable and nutritious stock food, which may be mixed with protein foods, as cotton-seed meal or other meal cake, or with such other nutritive substances as may be preferred. Essential constituents of the food-product are the sugars resulting from the hydrolysis, and the sodium chlorid derived from the hydrolyzing agent.

The hydrolysis may be carried out in accordance with any known or approved process. For instance, the raw material may be shredded or otherwise comminuted, commingled with about one per cent. by weight of hydrochloric acid dissolved in sufficient water to moisten the charge, and digested for ten to sixty minutes by direct contact with steam under pressure. The cooked mass, containing a considerable proportion of sugars, is then sprayed or otherwise mixed with a highly dilute solution of sodium carbonate until the free acid is neutralized. It is thereafter dried to expel excess moisture, and is then ready for use, either alone or mixed with other nutritive bodies.

I claim:

1. As a new article of manufacture, a food-product derived from cellulosic materials, said food-product containing sugars resulting from the hydrolytic action of a chlorin-containing hydrolyzing agent, the unconverted residue of the hydrolysis, and sodium chlorid derived from the hydrolyzing agent, and free from excess moisture.

2. The method of preparing food-products from ligno-cellulose, which consists in subjecting cellulosic materials to a chlorin-containing hydrolyzing agent under conditions to produce sugars, then converting the hydrolyzing agent into sodium chlorid and freeing the mass from excess moisture.

In testimony whereof I affix my signature in presence of two witnesses.

ARTHUR D. LITTLE.

Witnesses:
HARRY S. MORK,
AMY MONTGOMERY.